(12) United States Patent
Robitaille et al.

(10) Patent No.: US 9,106,706 B2
(45) Date of Patent: Aug. 11, 2015

(54) SYSTEMS AND METHODS OF USING BEACON MESSAGES TO DISCOVER DEVICES ACROSS SUBNETS

(75) Inventors: Claude Robitaille, St-Placide (CA); Pierre Bouffard, Ste-Marthe-sur-Lac (CA)

(73) Assignee: Accedian Networks Inc., Saint-Laurent (CA)

( * ) Notice: Subject to any disclaimer, the term of this patent is extended or adjusted under 35 U.S.C. 154(b) by 153 days.

(21) Appl. No.: 13/552,022

(22) Filed: Jul. 18, 2012

(65) Prior Publication Data

US 2014/0025790 A1   Jan. 23, 2014

(51) Int. Cl.
*G06F 15/177* (2006.01)
*H04L 29/12* (2006.01)

(52) U.S. Cl.
CPC .................................. *H04L 61/2015* (2013.01)

(58) Field of Classification Search
USPC .................................................. 709/220, 224
See application file for complete search history.

(56) References Cited

U.S. PATENT DOCUMENTS

| | | | | |
|---|---|---|---|---|
| 6,166,688 | A * | 12/2000 | Cromer et al. | 342/357.74 |
| 6,367,037 | B1 | 4/2002 | Remer et al. | |
| 6,865,602 | B1 | 3/2005 | Nijemcevic et al. | |
| 6,987,743 | B2 | 1/2006 | Chen et al. | |
| 7,039,688 | B2 | 5/2006 | Matsuda | |
| 7,225,243 | B1 | 5/2007 | Wilson | |
| 7,440,781 | B2 * | 10/2008 | Beach et al. | 455/574 |
| 7,570,657 | B1 | 8/2009 | Lo | |
| 7,778,162 | B2 | 8/2010 | Yu | |
| 7,787,455 | B2 | 8/2010 | Cherchall et al. | |
| 7,912,075 | B1 | 3/2011 | Holland et al. | |
| 8,023,465 | B2 | 9/2011 | Prehofer | |
| 8,098,671 | B1 | 1/2012 | Deruijter et al. | |
| 8,233,437 | B2 | 7/2012 | Tazaki | |
| 8,315,626 | B2 * | 11/2012 | Huotari et al. | 455/435.2 |
| 8,360,975 | B1 * | 1/2013 | Schwieterman et al. | 600/300 |
| 8,509,072 | B2 | 8/2013 | Lee et al. | |
| 8,571,029 | B1 | 10/2013 | Aggarwal et al. | |
| 8,588,751 | B2 * | 11/2013 | Rinta-Aho et al. | 455/414.1 |
| 2003/0053421 | A1 | 3/2003 | Yoshimura | |
| 2003/0056008 | A1 | 3/2003 | Russell et al. | |
| 2003/0225864 | A1 | 12/2003 | Gardiner et al. | |
| 2003/0229809 | A1 | 12/2003 | Wexler et al. | |

(Continued)

FOREIGN PATENT DOCUMENTS

| | | |
|---|---|---|
| EP | 2421200 | 2/2012 |
| KR | 20090004239 | 1/2009 |
| WO | 2011/054006 | 5/2011 |

OTHER PUBLICATIONS

Cheshire, et al. "Dynamic Configuration of IPv4 Link-Local Addresses," May 2005, 33 pages.

(Continued)

*Primary Examiner* — Jude Jean Gilles
(74) *Attorney, Agent, or Firm* — Nixon Peabody LLP

(57) ABSTRACT

A method of discovering a device to be discovered in a communication network having multiple interconnected nodes includes transmitting, by a discoverer, at least one beacon signal including an IP address to the network. The device to be discovered receives the at least one beacon signal. The device to be discovered configures the IP address located in the at least one beacon signal. Additionally, the device to be discovered transmits an advertisement to a server specified by the discoverer.

20 Claims, 3 Drawing Sheets

(56) References Cited

U.S. PATENT DOCUMENTS

| | | | |
|---|---|---|---|
| 2004/0249906 A1 | 12/2004 | Olbricht et al. | |
| 2005/0135306 A1* | 6/2005 | McAllen et al. | 370/329 |
| 2005/0138428 A1* | 6/2005 | McAllen et al. | 713/201 |
| 2005/0281256 A1 | 12/2005 | Taipale et al. | |
| 2006/0274671 A1* | 12/2006 | Budampati et al. | 370/254 |
| 2007/0019598 A1 | 1/2007 | Prehofer | |
| 2008/0140815 A1 | 6/2008 | Brant et al. | |
| 2008/0205341 A1* | 8/2008 | Koh et al. | 370/331 |
| 2008/0261574 A1* | 10/2008 | Rinta-Aho et al. | 455/414.3 |
| 2009/0085806 A1* | 4/2009 | Piersol et al. | 342/386 |
| 2009/0201886 A1* | 8/2009 | Lee et al. | 370/335 |
| 2010/0054154 A1* | 3/2010 | Lambert et al. | 370/254 |
| 2010/0274917 A1 | 10/2010 | Cherchali et al. | |
| 2010/0280858 A1 | 11/2010 | Bugenhagen | |
| 2011/0283140 A1 | 11/2011 | Stevens et al. | |
| 2011/0304583 A1* | 12/2011 | Kruglick | 345/174 |
| 2011/0305150 A1 | 12/2011 | Haver et al. | |
| 2012/0014383 A1 | 1/2012 | Geromel et al. | |
| 2012/0105877 A1 | 5/2012 | Wakamatsu | |
| 2012/0230186 A1 | 9/2012 | Lee et al. | |
| 2012/0284517 A1* | 11/2012 | Lambert | 713/169 |
| 2012/0320751 A1 | 12/2012 | Zhu | |
| 2013/0172036 A1* | 7/2013 | Miklos et al. | 455/517 |
| 2013/0346591 A1* | 12/2013 | Carroll et al. | 709/224 |

OTHER PUBLICATIONS

Plummer, "An Ethernet Address Resolution Protocol—or—Converting Network Protocol Addresses to 48.bit Ethernet Address for Transmission on Ethernet Hardware," Nov. 1982, 10 pages.

Malkin, "Traceroute Using an IP Option," Jan. 1993, 7 pages.

https://lkml.org/lkml/2005/10/19/46 on Oct. 16, 2012, Ingo Molnar, Oct. 19, 2005, 7 pages.

Sosnoski, "Classworking toolkit: Combining source and bytecode generation," Oct. 4, 2005, 9 pages.

Cyclone IV Device Handbook, vol. 1, Altera, Dec. 2010 (478 pages).

IEEE Standard for Information Technology, Part 3: Carrier Sense Multiple Access with Collision Detection (CSMA/CD) access method and Physical Layer specifications, 2008 (315 pages).

Gigabit Ethernet Auto-Negotiation, by Rich Hernandez, www.dell.com/powersolutions, 1999 (6 pages).

Thomas, G. "Incorporating Media Converters." Contemporary Control Systems, Inc. the Extension. vol. 7, No. 6, Nov. 2006 [online] [retrieved on Dec. 4, 2013]. Retrieved from the Internet: <URL: http://www.ccontrols.com/pdf/Extv7n6.pdf> (4 pages).

Avago Technologies. "1000BASE-T Interface and Functionality of ABCU-57xxRZ Gigabit Ethernet Small Form Puggable Electrical Transceivers Over Category 5 Unshielded Twisted Pair Cable—Application Note 5286." XP055091424, Sep. 14, 2010 [online] [retrieved on Dec. 4, 2013]. Retrieved from the Internet <URL: http://www.avagotech.com/docs/AV02-2643EN‎> (16 pages).

International Search Report and Written Opinion mailed Nov. 26, 2013 which issued in International Patent Application No. PCT/IB2013/001559 (8 pages).

International Search Report and Written Opinion mailed Dec. 4, 2013 which issued in International Patent Application No. PCT/IB2013/001557 (9 pages).

International Search Report and Written Opinion mailed Dec. 9, 2013 which issued in International Patent Application No. PCT/IB2013/001556 (7 pages).

Extended European Search Report mailed Dec. 18, 2013 which issued in European Patent Application No. 13183360.0 (11 pages).

* cited by examiner

DHCP Message Format

| Offset | 0 - 7 | 8 - 15 | 16 - 23 | 24 - 31 |
|---|---|---|---|---|
| 0 | op | htype | hlen | hops |
| 4 | xid | | | |
| 8 | secs | | flags | |
| 12 | ciaddr | | | |
| 16 | yiaddr | | | |
| 20 | siaddr | | | |
| 24 | giadd | | | |
| 28 | chaddr (16B) | | | |
| 44 | sname (64B) | | | |
| 108 | file (128B) | | | |
| 236 | option | | | |

FIG. 2
(PRIOR ART)

SYSTEMS AND METHODS OF USING BEACON MESSAGES TO DISCOVER DEVICES ACROSS SUBNETS

CROSS-REFERENCE TO RELATED APPLICATIONS

This application incorporates by reference in their entireties the following applications, all of which have the same filing date as the present application: U.S. application Ser. No. 13/551,804, "Programmable Small Form-Factor Pluggable Module," by Robitaille and Ostiguy; U.S. application Ser. No. 13/551,998 "Systems and Methods of Detecting and Assigning IP Addresses to Devices with ARP Requests," by Robitaille and Lemieux; U.S. application Ser. No. 13/552,063, "Systems and Methods of Discovering and Controlling Devices without Explicit Addressing," by Robitaille and Bouffard; U.S. application Ser. No. 13/551,984, "Systems and Methods of Installing and Operating Devices without Explicit Network Addresses," by Robitaille and Lemieux.

TECHNICAL FIELD

This invention is directed towards addressing the need for discovering when a device has been connected on a network. The discovery process shall be carried without the need for specific layer-2 or layer-3 addressing information about the device(s) to discover. This discovery process can be carried out by a discoverer/tester that is located in the network. The discoverer could either be implemented in a centralized manner or in a distributed manner.

BACKGROUND

There is a need to be able to discover any number of devices in any directly or indirectly reachable networks when they may not have any layer-2 and/or layer-3 addressing information since they do not actively participate in any of the normal network protocols in use.

Often the IDs or labels used by the protocols are not the same in both directions. If the device is not participating in the underlying protocols (e.g., MPLS, L2TPv3, GTP-U, etc.), the device (Small Form-Factor Pluggable (SFP) with a Field Programmable Gate Array (FPGA), Network Interface Device (NID), module or other platform) does not know what ID or label to use to communicate.

BRIEF SUMMARY

The device to be discovered must be able to be discovered without (but not excluding) being pre-programmed with information specific to the network or the control infrastructure.

After the discovery of a device, the discovered device can notify the discoverer of its presence via an Advertisement message. Once the server specified by the discoverer receives a valid Advertisement message, it can proceed with assigning a Layer-2 and/or Layer-3 address to the discovered device as required. Alternatively, the discoverer can provide information to the discovered device on how to obtain a layer-2 and/or layer-3 address from other services available on the network where the discovered device is located.

In one embodiment, the discovery process is used to enable an initial management access where a newly discovered device can be put in a state where it can receive further configuration, control, management or even new firmware information from a remote management entity, the management entity not necessarily being the same as the discoverer.

According to one aspect of the present invention, a method of discovering a device to be discovered in a communication network having multiple interconnected nodes includes transmitting, by a discoverer, at least one beacon signal including an IP address to the network. The device to be discovered receives the at least one beacon signal. The device to be discovered configures the IP address located in the at least one beacon signal. Additionally, the device to be discovered transmits an advertisement to a server specified by the discoverer.

According to a further aspect of the present invention, a system for discovering a device to be discovered in a communication network having multiple interconnected nodes includes the device to be discovered and a discoverer. The discoverer is coupled to a first processor and is configured to transmit at least one beacon message including an IP address to the communication network. The device to be discovered is coupled to a second processor and is configured to receive the at least one beacon message transmitted by the discoverer and to configure the IP address from the at least one beacon signal. The device to be discovered transmits an advertisement to a server specified by the discoverer in the at least one beacon signal.

BRIEF DESCRIPTION OF THE DRAWINGS

The foregoing and other advantages of the present disclosure will become apparent upon reading the following detailed description and upon reference to the drawings.

FIG. 2 illustrates a prior art DHCP frame format;

Figure 1:
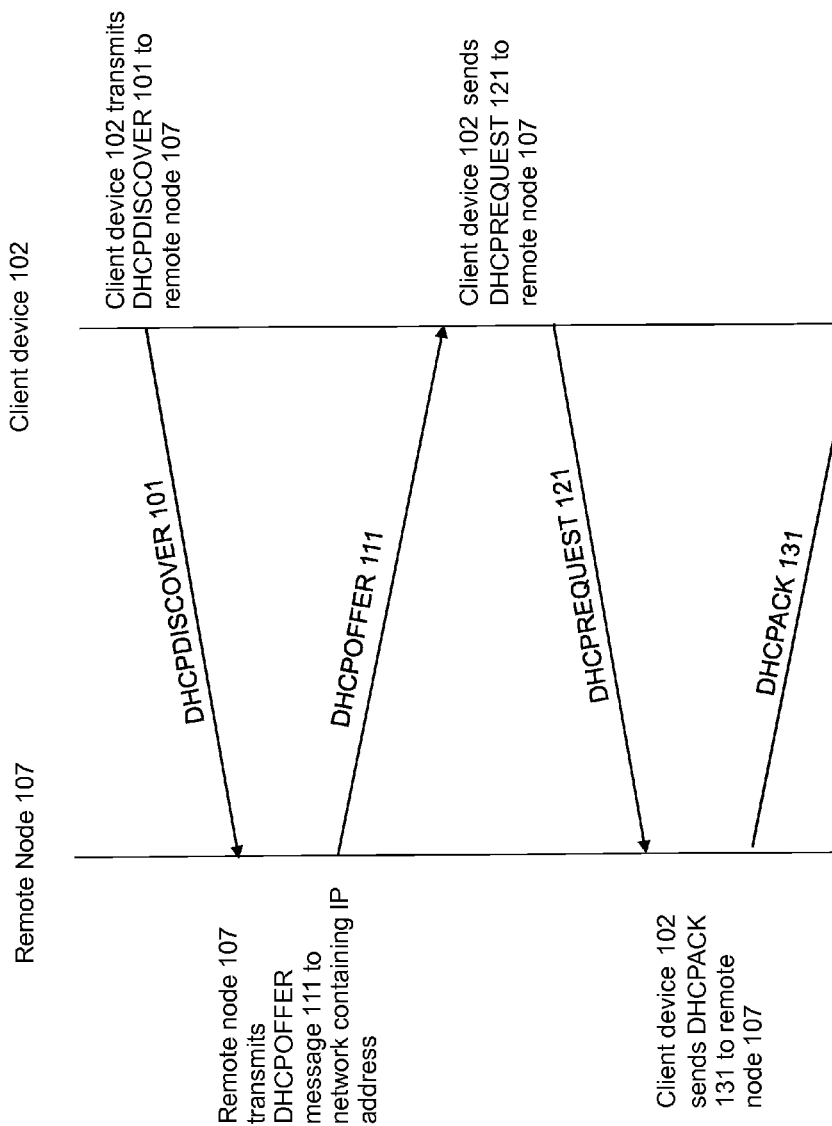
FIG. 1 illustrates a prior art DHCP message exchange between a device looking for an IP address and a server configured to provide a valid IP address to the requesting node.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Different types of devices can be discovered in the network using one of the embodiments of the present invention. The term discoverer is used to describe a system (e.g., testing unit, router, remote node, etc.) that has direct or indirect access to the subnet where a device to be discovered is located. Since the discoverer is not necessarily directly located on the same subnet as the device(s) to be discovered, necessary addressing information about the discoverer is included in a beaconing message to allow the newly discovered device(s) to reply with an Advertisement message that will reach the discoverer.

When the device to discover is on the same IP subnet as the discoverer, layer-2 broadcast techniques may be used to facilitate the discovery process. Techniques based on layer-2 (broadcast or unicast) cannot be used when the device to discover is not located on the same IP subnet as the discoverer. For simplicity of installation and deployment, the device to discover needs to be discovered without any prior configuration settings in the device to discover. This means that the device to discover does not have any information about reaching a DHCP server located on a different IP subnet and is not allowed to proactively take steps to be discovered by a discoverer unless it is prompted to do so with a communication from a discoverer node. Such a restriction is needed since the device to discover may be embodied in a variety of systems that are not permanently installed in a network and may need to be activated only under specific circumstances and for a limited period of time. The discovery process therefore needs to be initiated by a discoverer node and needs to operate across one or more IP subnet.

In order for the discovery process to operate seamlessly across subnet boundaries, the discoverer needs to be able to craft a stateless packet that can be broadcast across one or more IP subnet and reach the device(s) to be discovered. Since there is no way to control the IP routers, gateways or firewall that may be installed at the boundaries of an IP subnet, the choice of the packet encoding used needs to be completely transparent to any router, gateway or firewall and must not conflict with the proper operation of the network and of the devices inside the network. The Dynamic Host Configuration Protocol (DHCP—RFC 2131) has been selected as the basis for this invention since it is widely supported by routers, gateways and firewalls and is stateless as far as these devices are concerned. Furthermore, DHCP messages are well suited for the discovery process since they are encapsulated as User Datagram Protocol (UDP) packets and can be broadcast on any subnet. When the discoverer is not located on the same subnet as the device to be discovered, the DHCP Relay function (RFC 3046) can be used to reach remote subnets in order to reach any undetected devices.

The DHCP protocol exchange is usually initiated by a device looking for an IP address it can use. The standard prior art DHCP message exchange is illustrated by FIG. 1. Such prior art DHCP message exchange is commonly referred to as a 4-way handshake. The 4-way handshake consists of sending a first message 101 DHCP DISCOVER from a device 102 looking for an IP address to a server or remote node 107 capable of offering an IP address. The DHCP DISCOVER message 101 is a broadcast message. The server replies with a DHCP OFFER message 111 that contains an IP address offered to the device 102. This DHCP OFFER 111 message is also a broadcast message. The device 102 replies with a third message, DHCP REQUEST message 121 to formally request that the offered IP address be assigned to it for the duration of a lease as determined by the server 107. The server 107 then replies with a fourth message, DHCP ACK 131 to confirm that the IP address is now officially assigned to the device 102 which can use it for the duration of the lease as determined by the server 107.

According to systems and methods of the present invention, the device to be discovered is passively waiting to be discovered. The discovery process therefore needs to be initiated by the discoverer and the traditional 4-way DHCP exchange cannot be applied as defined in the art. However, according to the present invention, the DHCP OFFER message, if modified, may be used by the discoverer as an unsolicited message or beacon. The DHCP OFFER message is modified in such a way as to be rejected by any other device that supports the traditional 4-way DHCP message handshake. The modified DHCP OFFER shall also carry information to allow the device to be detected or discovered to determine whether the DHCP OFFER message originates from a valid discoverer and is not part of the 4-way DHCP handshake. Finally, the modified DHCP OFFER message shall still be able to be relayed to other subnets by a standard implementation of the DHCP RELAY function supported by popular Routers, Switches, Gateways and other devices.

Each DHCP messages share a common format, as shown below. DHCP uses Uniform Data Protocol (UDP) as the transport layer protocol. Referring now to FIG. 2, the fields in a DHCP message are defined below:

TABLE 1

Fields in a DHCP Message.

| DHCP Message Field | Description |
| --- | --- |
| Operation Code | Specifies the type of the Dynamic Host Configuration Protocol (DHCP) message. Set to 1 in messages sent by a client device (requests) and 2 in messages sent by a server or remote node (response). |
| Hardware Type | Specifies the network LAN architecture. For example, the Ethernet type is specified when hardware type is set to 1. |
| Hardware Address Length | Link-layer address length (in bytes); defines the length of hardware address in the chaddr field. For Ethernet, this value is 6. |
| Hops | Number of relay agents that have forwarded this message. |
| Transaction identifier (XID) | Used by client devices to match responses from servers with previously transmitted requests. |
| seconds | Elapsed time (in seconds) since the client device began the Dynamic Host Configuration Protocol (DHCP) process. |
| Flags | Flags field is called the broadcast bit, can be set to 1 to indicate that messages to the client device must be broadcast |
| ciaddr | Client device's IP address; set by the client device when the client device has confirmed that its IP address is valid. |
| yiaddr | Client's IP address; set by the server or remote node to inform the client device of the client device's IP address. |
| siaddr | IP address of the next server for the client device to use in the configuration process (for example, the server to contact for TFTP download of an operating system kernel). |
| giaddr | Relay agent (gateway) IP address; filled in by the relay agent with the address of the interface through which Dynamic Host Configuration Protocol (DHCP) message was received. |
| chaddr | Client device's hardware address. (Layer 2 address) |
| sname | Name of the next server for the client device to use in the configuration process. |
| file | Name of the file for the client device to request from the next server (for example the name of the file that contains the operating system for this client). |

Looking at the above format for DHCP messages, the following fields are modified or interpreted differently when used by the discoverer to detect new devices:Transaction identifier: this field is normally set by a DHCP client device. When used as part of the modified DHCP OFFER, this 32-bit field includes a unique encryption key that is used to encrypt select portions of the modified DHCP OFFER message. This optional cryptographic information can be used to protect (encrypt) critical elements of the DHCP OFFER message including, but not limited to the siaddr and the giaddr fields. Flags: the broadcast bit shall be set to 1. All other bits are typically ignored and should be set to zero (0) for future compatibility.

Ciadd: the client IP address field should be set to 0.

Yiaddr: this field shall be set to 0. In a normal DHCP OFFER message, this field is used by a DHCP Server to inform a client of the IP address that has been reserved for it.

Siaddr: this is the IP address of the management device that will handle the management functions for the detected device.

Chaddr: this field shall be set to 0. In a normal DHCP OFFER message, this field is used to carry the hardware (for example Ethernet MAC) address of the client.

Sname: this field shall be set to 0.

File: this field shall be set to 0.

The modified DHCP OFFER 201 (in FIG. 2) is further modified via the following option list:

Server ID (option 54): this option shall include the discoverer IP address. This will be used by the detected device to return the ADVERTISEMENT message.

Vendor ID (option 43): this option shall be set to a unique string identifying the vendor and used by the detected device to filter out other DHCP OFFER it could inadvertently receive.

Vendor Information (option 60, also known as Vendor Class Identifier): this option field is used to carry additional information about the discoverer as well as information of interest to a detected device. Among others, this option field typically includes the following information: IP address configuration mode, Organizational Unique Identifier (OUI), rate of transmission, Time to Live (TTL), Supported Type-Length-Value, and other information. The IP address configuration mode is used to indicate to the detected device how it should obtain an IP address. Typical choices include (but are not limited to): using a static IP address, obtaining an IP address via the normal 4-way DHCP message handshake or the detected device automatically generating its own IP address based on an IP subnet provided by the detector/discoverer or specified in the default (or current) configuration settings for the detected/discovered device. The OUI is a unique value assigned to the Vendor by the Internet Assigned Numbers Authority (IANA) and is used to filter out improper messages. The rate of transmission is the rate at which a detected device shall repeatedly transmit an Advertisement message to indicate it is still present in the network. TTL is the field that is decremented by a detected device. Supported TLV may contain a number of fields depending on the range of information to be exchanged between the discoverer and the detected device.

Figure 3:
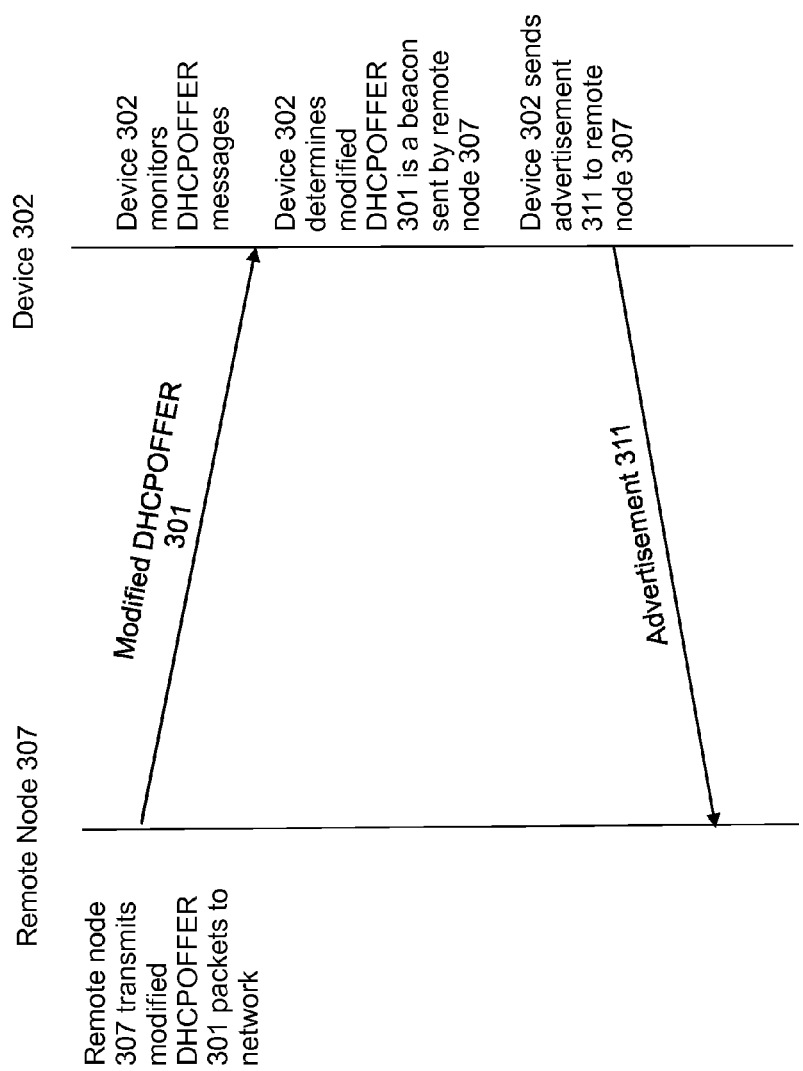
FIG. 3 is a message flow diagram showing the exchange of a modified DHCP message between a discoverer and a device to be discovered and an Advertisement message returned by the detected or discovered device.

Referring now to FIG. 3, the modified DHCP OFFER message 301 also referred to as a beacon message or signal could be transmitted directly by the discoverer into the network using a broadcast. The DHCP OFFER message 301 could also be transmitted into the network indirectly via a list of DHCP relay functions available in the network. When the device to be discovered 302 receives one of these beacons, it first verifies to see if it is in fact a beacon transmitted by the discoverer. If the beacon is a beacon transmitted by the discoverer 307, then the device will use the information included in the modified DHCP OFFER 301 message to update its operation. It will then reply to the IP address of the Server as specified via option 54 in the beacon with an Advertisement 311 message to be transmitted repeatedly at the rate specified in the modified DHCP OFFER 301. By repeatedly transmitting Advertisement messages 311, it allows the management server specified in the beacon to detect an eventual disappearance of a detected device (or the fact that it is no longer reachable).

In order for the discovered device to begin to transmit the Advertisement message, the device should obtain a valid IP address as specified in the beacon message. Once the device has obtained a valid IP address, the transmission of the Advertisement message can begin. FIG. 3 shows an example of this. The discoverer 307 transmits modified DHCPOFFER 301 into the network. Device 302 receives modified DHCPOFFER 301 and verifies that it is a modified DHCPOFFER transmitted by discoverer 307. Device 302 then configures its IP address as per the information in the modified DHCP OFFER 301, and sends Advertisement 311 to the IP address specified in the beacon 301. According to one aspect of the present invention, the IP address may be the same node as the discoverer 307. The Advertisement message 311 is directly encapsulated in a UDP packet and sent as a unicast. The UDP port to use for the unicast Advertisement message may be extracted from the beacon message. In another embodiment, the UDP port is coded in the firmware of the device to be discovered or can be defined as part of a configuration profile.

The content of the Advertisement message 311 includes information about the detected or discovered device 302, including but not limited to: port identifier, device name, device description, IP address of the device (if known), serial number, firmware/software revision, base MAC address, configuration status, platform identifier, slot identifier, module information, and so on. The information may be encoded using the popular Type-Length-Value (TLV) format. In another embodiment, the information of the Advertisement packet may be encoded as a sequence of position dependent fields with pre-agreed lengths.

In another embodiment, the detected or discovered device may enable access to other undetected devices downstream from the device. When this is the case, the TTL value specified in option 60 of the beacon should be decremented by a value of 1 and if not zero (0), the newly detected device may elect to forward the beacon to other devices only reachable through the detected device.

As disclosed earlier, the modified DHCP OFFER message (beacon) is broadcast by the discoverer as an unsolicited message in order to reach as many undetected devices as possible. In another embodiment, the DHCP OFFER message (beacon) may be transmitted as a directed unicast packet to a specific previously detected device when the detected device cannot be reached using a valid destination IP address. This may occur when a device is in an unknown state and needs to be reset to a previously defined state (such as a factory default state) or when a detected device needs to receive additional information before it can obtain a valid IP address for further communication. A typical unicast packet includes the IP address of the remote device. In this embodiment, the detected device does not yet have a valid IP address and cannot therefore be reached using this method. In order to make sure the beacon is only valid for that specific device, as would a standard unicast UDP packet, the modified DHCP OFFER message should include other information that is unique to this device to be discovered. This information may include (but is not limited to): serial number, MAC address, device name or any other unique identifier where the unique identifier may be a combination of any of these individual identifiers.

The device to discover and the discoverer node are each coupled to a processor. The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of discovering an undetected device to be discovered in a communication network having multiple interconnected nodes, comprising:
    transmitting, by a discoverer to the device to be discovered, at least one beacon signal including an IP address to the network and forwarding instructions,
        said transmitting based on Dynamic Host Configuration Protocol (DHCP);
    receiving, by the device to be discovered, the at least one beacon signal;
    configuring the device to be discovered with the IP addressing information located in the at least one beacon signal; and
    configuring the device to be discovered with forwarding instructions located in the at least one beacon signal, to forward the beacon signal to one or more undetected devices downstream; and
    transmitting, by the device to be discovered, an advertisement to a server specified by the discoverer.

2. The method of claim 1, wherein the discoverer transmits a plurality of beacon signals to the network.

3. The method of claim 2, wherein the discoverer transmits the plurality of beacon signals at a predetermined rate to the network.

4. The method of claim 1, wherein the discoverer transmits the at least one beacon signal across one or more IP subnets.

5. The method of claim 1, wherein the discoverer transmits the at least one beacon signal with information directly addressed to a specific device to be discovered.

6. The method of claim 5, wherein the beacon signal addressed to the specific device to be discovered carries information to uniquely address the specific device to be discovered, the information being other than an IP address or a MAC address.

7. The method of claim 1, wherein the discoverer transmits the at least one beacon signal via broadcast.

8. The method of claim 1, wherein the device to be discovered is a programmable pluggable module with a field programmable gate array (FPGA).

9. The method of claim 1, wherein the device to be discovered continuously monitors for beacon signals transmitted by the discoverer.

10. The method of claim 1, wherein the transmission of the advertisement is done at regular intervals by the device to be discovered, after is has been discovered, using a valid IP address.

11. The method of claim 10, wherein the transmission of the advertisement takes place at regular intervals at a rate specified by the beacon message.

12. The method of claim 10, wherein the transmission of the advertisement takes place at regular intervals at a rate specified by pre-configured settings or programmed into firmware or processor of the device to be discovered.

13. The method of claim 1, wherein the server specified by the discoverer is the discoverer.

14. A system for of discovering a device to be discovered in a communication network having multiple interconnected nodes, comprising:
   a discoverer coupled to a first processor, wherein said discoverer transmits at least one beacon message including an IP address to the device to be discovered over the communication network, wherein the at least one beacon message is a dynamic host configuration protocol (DHCP) offer message modified so as to be rejected by any device that supports a traditional 4-way DHCP message handshake; and
   a device to be discovered coupled to a second processor, wherein the device to be discovered is an undetected device on the network and receives the at least one beacon message transmitted by the discoverer and configures the IP address of the device to discover from the at least one beacon signal;
   wherein the device to be discovered is configured by the at least one beacon message to forward the beacon to one or more undetected devices downstream; and
   wherein the device to be discovered transmits an advertisement to a server specified by the discoverer in the at least one beacon signal.

15. The system of claim 14, wherein the discoverer is one of
   (1) a testing unit,
   (2) a router, or
   (3) a remote node that is local or remote to a subnet.

16. The system of claim 14, wherein the device to be discovered is a programmable pluggable module inserted in a hosting device.

17. A method of discovering an undetected device to be discovered in a communication network having multiple interconnected nodes, comprising:
   transmitting, by a discoverer to the device to be discovered, at least one beacon signal including an IP address to the network,
      wherein the at least one beacon signal is a modified dynamic host configuration protocol (DHCP) offer message;
   receiving, by the device to be discovered, the at least one beacon signal;
   configuring the device to be discovered with the IP addressing information located in the at least one beacon signal; and
   configuring the device to be discovered with forwarding instructions located in the at least one beacon signal, to forward the beacon signal to one or more undetected devices downstream; and
   transmitting, by the device to be discovered, an advertisement to a server specified by the discoverer.

18. A method of discovering an undetected device to be discovered in a communication network having multiple interconnected nodes, comprising:
   transmitting, by a discoverer to the device to be discovered, at least one beacon signal including an IP address to the network, wherein the discoverer transmits the at least one beacon signal across one or more IP subnets via a list of dynamic host configuration protocol (DHCP) relay functions available in the network;
   receiving, by the device to be discovered, the at least one beacon signal;
   configuring the device to be discovered with the IP addressing information located in the at least one beacon signal; and
   configuring the device to be discovered with forwarding instructions located in the at least one beacon signal, to forward the beacon signal to one or more undetected devices downstream; and
   transmitting, by the device to be discovered, an advertisement to a server specified by the discoverer.

19. A method of discovering an undetected device to be discovered in a communication network having multiple interconnected nodes, comprising:
   transmitting, by a discoverer to the device to be discovered, at least one beacon signal including an IP address to the network,
      wherein the at least one beacon message is partially encrypted using a crypto key included in a payload of the at least one beacon signal, said encryption used to protect said at least one beacon signal;
   receiving, by the device to be discovered, the at least one beacon signal;
   configuring the device to be discovered with the IP addressing information located in the at least one beacon signal; and
   configuring the device to be discovered with forwarding instructions located in the at least one beacon signal, to forward the beacon signal to one or more undetected devices downstream; and
   transmitting, by the device to be discovered, an advertisement to a server specified by the discoverer.

20. A method of discovering an undetected device to be discovered in a communication network having multiple interconnected nodes, comprising:
   transmitting, by a discoverer to the device to be discovered, at least one beacon signal including an IP address to the network, wherein a payload of the at least one beacon signal is encoded using a Type-Length-Value (TLV) encoding or position-based encoding;
   receiving, by the device to be discovered, the at least one beacon signal;
   configuring the device to be discovered with the IP addressing information located in the at least one beacon signal; and
   configuring the device to be discovered with forwarding instructions located in the at least one beacon signal, to forward the beacon signal to one or more undetected devices downstream; and
   transmitting, by the device to be discovered, an advertisement to a server specified by the discoverer.

* * * * *